United States Patent

Spahl et al.

[11] Patent Number: 5,999,607
[45] Date of Patent: *Dec. 7, 1999

[54] METHOD AND APPARATUS FOR RESTRICTING DIALING AUTHORIZATION IN COMMUNICATION DEVICES

[75] Inventors: Siegfried Spahl, Puchheim, Germany; Guenter Lukas, Vienna, Austria

[73] Assignee: Siemens Aktiengesellschaft, Munich, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/818,561

[22] Filed: Mar. 14, 1997

[30] Foreign Application Priority Data

Mar. 15, 1996 [DE] Germany .............. 196 10 287

[51] Int. Cl.$^6$ ........................................... H04M 1/66
[52] U.S. Cl. ........................... 379/200; 379/93.02
[58] Field of Search ............................ 379/200, 903, 379/357, 93.02

[56] References Cited

U.S. PATENT DOCUMENTS 5,497,411  3/1996  Pellerin ........................... 379/200
5,809,126  9/1998  Smith et al. ..................... 379/200

OTHER PUBLICATIONS

Liske, Lutz and Maier, Anton: "ISDN im Buro–HICOM", Seite 41, 42 and 49, Siemens AG, Berlin & Munchen.

Primary Examiner—Creighton Smith
Attorney, Agent, or Firm—Hill & Simpson

[57] ABSTRACT

A communications system includes a processor and associated memory containing information identifying dialing authorizations for a plurality of Personal Identification Numbers thereby a user to enter a personal identification number to receive access to authorized connections.

10 Claims, 1 Drawing Sheet

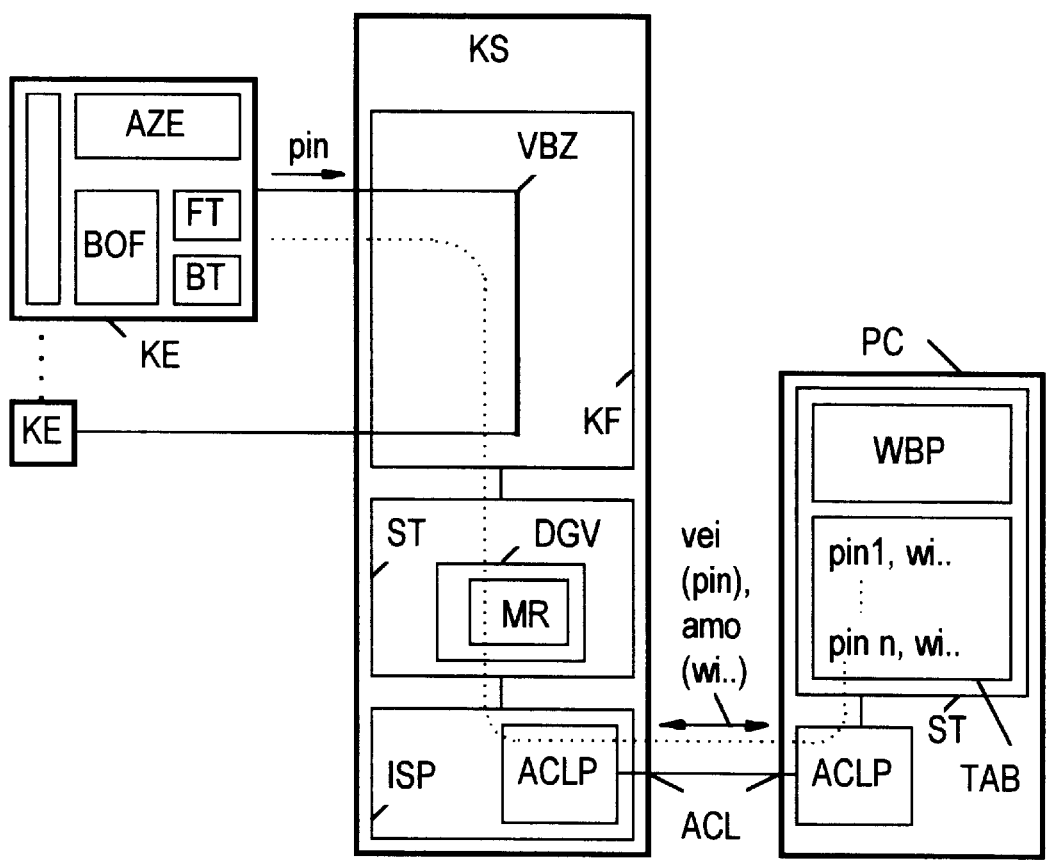

METHOD AND APPARATUS FOR RESTRICTING DIALING AUTHORIZATION IN COMMUNICATION DEVICES

BACKGROUND OF THE INVENTION

1. Field of the Invention

The present invention relates generally to the field of telecommunications equipment and, more particularly, the present invention relates to an improved method and apparatus for restricting dialing authorization in communications terminal equipment.

2. Description of the Related Art

In telecommunications systems, an Applications Connectivity Link, ACL interface, is provided for controlling performance features in communications networks such as, for example, private communications networks, the coupling of communications systems and in particular, private branch exchanges having data processing apparatus. In a use of such an application interface, ACL, a private communication system, such as, for example, the HICOM 300 manufactured by Siemens Corporation is connected with a data processing apparatus via a V.24 interface, or alternatively via an ISDN base interface (SO). The application interface ACL is preferably realized in an operations and maintenance unit of a communication system. In the HICOM 300 system, it is an integrated operations and maintenance server which controls the communications exchange according to a defined protocol with defined messages. This may be for example, the MSV1. The information embedded in messages corresponds to the switch-oriented instructions and event messages of the communication system. As a connecting element between the data processing installation and the communication system, a program structure is provided in this system that is suited for the execution of switching-oriented instructions and for generating switching-oriented event messages. For example, this is a program structure that is controlled by a data processing installation and supports connection setups. Connection control is influenced by the switching-oriented instructions and the current switching-oriented state of connections is indicated by switching-oriented event messages.

In private communication networks, for certain communication terminal devices connected to the communications system, such as, for example, conference rooms, no fixed allocation to subscribers or persons is provided. Communication terminal devices of this type should be able to be used by the widest variety of persons with varying individual dialing authorizations. Restricted dialing authorizations may also be used. Other objects and advantages of the present invention will be apparent from the following summary and detailed description of the preferred embodiments of the claimed invention. One object of the present invention is the construction of a communication system with flexible person-specific dialing authorizations for connected communication terminal devices.

SUMMARY OF THE INVENTION

One aspect of the invented method is that a processor controlled application is connected to the communication system via an application interface and information restricting the dialing possibilities for an individual is allocated to personal identification information for which restricted dialing authorization is provided. In using the communication system and the application means, personal identification information is input during an introduction connection setup and is controlled by one of the communication terminal devices connected to the application means. The introduced connection setup is carried out while taking into account the indicated restricted dialing access. An essential advantage of the inventive method is that different or person specific dialing authorizations can be achieved in the communications system without requiring switching-oriented modifications. Through the use of convenient user interfaces at the application means, which is advantageously realized by a personal computer, authorizations or restricted authorizations can be arbitrarily configured. Thus, maximum potential flexibility is achieved in the allocation of restricted authorizations. Additionally, through the use of personal identification information and the allocation of information restricting the dialing authorizations, an extensive decoupling from the currently used communication terminal device is achieved.

According to an advantageous construction embodying the inventive method, information restricting the dialing possibilities is represented by information for which introduction connection setups are possible only for communication terminal devices inside the private communications network. Alternately, this may be accomplished through introduced connection setups which are possible only in communication terminal devices in the local area of the public communication system. Additionally, set up may be represented by at least one dialing information or by means of which introduced connection setups are possible only for communication devices determined by the at least one dialing information. These different possibilities for information restricting the dialing capabilities can be set in a manner specific to the personal identification information by means of corresponding inputs to the application device. Advantageously,information restricting the dialing capabilities can also be allocated to groups of personal identification information or specific communication terminal devices.

With numerous dialing information allocated to a given personal identification number, the information can be transmitted via the application device and the communication system to a communication terminal transmitting the personal identification information and be displayed there either acoustically or optically. After selecting the dialing information at the communication terminal device, a connection set up for the communication terminal device is determined by the selected dialing information. This variation is useful in particular for communication devices in which a person inputting a personal identification number can set up communication connections only from certain communication terminals. Further advantages and objects of the present invention will be comparent from the detailed description of the presently preferred embodiments in light of the drawings.

BRIEF DESCRIPTION OF THE DRAWINGS

FIG. 1 illustrates a schematic block diagram of the preferred embodiment of the present invention.

DETAILED DESCRIPTION OF THE PRESENTLY PREFERRED EMBODIMENTS

As set forth in more detail below, the inventive method and device is explained with reference to the schematic diagram of FIG. 1. The block schematic diagram of FIG. 1 shows a communication system KS and in particular, a private communication system, having an ACL (Applications Connectivity Link) interface via which an application means PC which is realized by a personal computer is connected. In the communications system KS, the ACL interface is realized by an ACL program structure ACLP implemented in an integrated operation and maintenance server ISP and in the personal computer PC. The ACL interface is provided in the control means ST thereof. Use of the ACL means that a communication exchange for an application-dependent connection control via a connection or a link via the ACL interface may be obtained. A dialing authorization program structure WPB is implemented in the personal computer PC.

For controlling switching oriented functions and for operation and maintenance control, the communication system KS comprises a control means ST connected with a coupling field KF and an integrated operation and maintenance server ISP. Along with the essential switching-oriented and operation and maintenance programs, a program structure DGV, which is controlled by a data processing installation and supports connection set ups is provided to work in conjunction with the personal computer PC.

In the coupling field KF, a traffic relation group VBZ is configured or installed using the control installation St to which group are allocated communication terminal devices KE that can be connected to the communication system KS. For example, two communication terminal devices KE are shown. The communication terminal devices KE are connected with the coupling field KF via subscriber connection modules, not shown for the sake of clarity. The communication terminal devices KE are equipped with a user interface BOF, for example a dialing keypad. Personal identification information such as a pin or dialing information WI are input thereat. The communication terminal devices KE respectively comprise a display unit AZE as well as a sequence key and an actuation key FT, BT. The display unit AZE may be, for example, an LCD display.

All switching oriented events vei, in the exemplary embodiment, such as those from the communication terminal devices KE allocated to the traffic relation group VBZ are acquired by means of the program structure DGV which is controlled by a data processing installation. The data processing installation supports connection set ups. The switching events are transmitted to the dialing authorization program structure WBP via the ACL interface. Similarly, switching oriented instructions amo transmitted by dialing authorization program structure WBP are executed by the program structure DGV which is controlled by a data processing installation and supports connection set ups. For example, this may be the indicated switching-oriented activities. In relation to the exemplary embodiment, connection set ups introduced by the communication terminal devices KE are acquired and personal identification information PIN is transmitted by the communication terminal device and the context of the connection set up is input at the user interface BOF. This is transmitted to the dialing authorization program structure via the ACL interface.

The program structure DGV which is controlled by a data processing installation and supports connection set ups, can alternatively be set in a pin monitoring operation in which particularly during a connection set up, the personal identification information pin input by the allocated communications terminal devices are acquired and transmitted by means of a respective message VEI to the personal computer PC. This reporting of input personal identification information PIN is taken over by a monitoring routine (indicated by dashed lines). This is achieved through software which is activated by means of corresponding administrative inputs to the communication system KS for respective traffic relation group VBZ.

Personal identification information PIN 1 . . . N are entered in the dialing authorization program structure WBP to which information dialing information wi..are respectively allocated. The respective personal identification information PIN is inserted into a table TAB by each person for whom a restricted dialing authorization is provided. It may be assumed for the sake of example, that the allocated dialing information wi determines those communication terminal devices KE to which the communication terminal device KE introducing a particular connection may be connected.

According to the invention, the allocated dialing information wi is transmitted (indicated by broken lines via the ACL interface) using the communication system KS. This is transmitted to the display unit AZE of the communication terminal device KE which is introducing the respective connection set up. It is then displayed there. In a respective communication terminal device KE, the sequence key FT is used to select a desired dialing information from the displayed dialing information wi by scrolling the dialing information wi. A connection set up for the communication terminal device KE is determined by the selected dialing information wi which is introduced by actuating the confirmation key BT.

If a personal identification number PIN is allocated to only one dialing information wi, displaying of the dialing information wi in the respective communication terminal device KE can be omitted. A connection set up to the communication terminal device KE is determined by the dialing information wi and can be introduced directly. The decision as to whether a transmission of the personal identification information PIN or an immediate connection set to a communication terminal device KE is introduced, is determined by the dialing authorization program WBP. The connection set up is transmitted by the formation and transmission of corresponding switching-oriented instructions to the program structure DGV. This is controlled by a data processing installation and supports connection set ups. It is implemented in the communication system KS and the set up is carried out there using the control means ST. In a further alternative of the inventive method, (not shown), the dialing information stored in the dialing authorization program structure WBP represents dialing information wi which indicates an "external connection." In relation to the exemplary embodiment, a logical zero is for example, stored as a dialing information. If a person dials a zero after the input of his personal identification information PIN, for example, he wishes, a connection set up out of the private communication system KS or alternatively out of the private network. This set up is prevented by the dialing authorization program structure WBP after evaluating in the structure. For example, "Not Authorized" may be displayed at the respective communication terminal device KE. Similarly, information restricting the dialing authorization can be stored which for example, prevents connection set ups in the remote areas of the public or private communication network.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

We claim our invention:

1. A method for restricting dialing authorization for a plurality of communication terminal devices that are connected to a communication system, comprising the steps of:

connecting a processor-controlled additional device via a central application connectivity link interface of the communication system;

storing additional device personal identification information for restricted dialing possibilities and restricted dialing possibilities which are allocated to the personal identification information;

detecting an item of personal identification information inputted at a respective communication terminal device during a connection setup, which is initiated by the respective communication terminal device, in the communication system using an additional routine which supports setup of connections;

forwarding said information to the additional device via the application connectivity link interface;

determining the restricted dial possibilities, which are allocated to the inputted personal identification information, using a dial authorization routine that is implemented in the additional device; and controlling, using the dial authorization routine and using the additional routine, an initiated connection setup in consideration of the determined restricted dial possibilities.

2. The method of claim 1, further comprising a step of exclusively allowing connection setup to communication terminal devices located within a private communication network.

3. The method of claim 1, further comprising a step of exclusively allowing connection setup to communication terminal devices in a local area of a public communication system.

4. The method of claim 1, comprising a step of restricting connection setup to a terminal device corresponding to a dialing information.

5. The method of claim 1, further comprising steps of:

displaying authorized dialing information at a terminal; and selecting an authorized dialing information and connecting the terminal based on the selected authorized dialing information.

6. The method of claim 1, further comprising a step of:

allocating a same information restricting dialing possibilities to a plurality of Personal Identification Numbers.

7. The method of claim 1, further comprising a step of entering a Personal Identification Number via a keypad.

8. The method of claim 1, further comprising:

a step of storing the information restricting dialing possibilities in a memory associated with a computer connected to the communication system.

9. The method of claim 1, further comprising a step of transmitting switching-oriented event messages.

10. Arrangement for restricting dial authorization of communication terminal devices connected to a communication system, comprising:

subscriber connection modules for connection of communication terminal devices which are connected with a coupling field that realizes a traffic relation group and which are connected with a central control, in which is arranged an additional routine that supports connection setups;

an interface module that realizes a central application connectivity link interface, which module is connected to the central control and with a further interface module arranged in a processor-controlled additional device; and a dialing authorization program routine in the additional device which controls restricted dialing authorization.

* * * * *